United States Patent Office 2,831,894
Patented Apr. 22, 1958

2,831,894

PROCESS FOR THE PRODUCTION OF N-ALKYLATED AROMATIC AMINES

Rudolf Stroh, Leverkusen-Bayerwerk, and Willi Hahn, Koln-Stammheim, Germany, assignors to Farbenfabriken Bayer Aktiengesellschaft, Leverkusen, Germany, a corporation of Germany No Drawing. Application May 1, 1956
Serial No. 581,823

Claims priority, application Germany May 9, 1955

5 Claims. (Cl. 260—577)

This invention relates to a process for the production of N-alkylated aromatic amines.

It is an object of the present invention to provide a novel economical process for the production of N-alkylated aromatic amines. Another object is to provide a process in which N-alkylated aromatic amines are obtained by direct alkylation of aromatic amines with olefines. A further object is to provide a catalyst which is easy to handle. Still further objects will appear hereinafter.

These objects are attained by alkylating an aromatic amine with an olefine at elevated temperature in the presence of an alkaline earth metal hydride.

Aromatic amines which are suitable for the process are for example aniline, the toluidines, xylidines, naphthylamines and derivatives thereof which are substituted in the nucleus, for example by halogen, alkyl, oxalkyl etc. Amines containing groups which render the catalyst ineffective, for example carboxylic acid groups, are unsuitable.

The gaseous olefines, such as ethylene, propylene and butylene, which are formed in the modern petroleum cracking processes, are examples of suitable olefines for use in the present process. Cyclo-olefines, aromatic substituted olefines, such as styrene as well as mixtures of olefines, can also be used.

The process according to the invention can be carried out by adding to the aromatic amine preferably about 1–5% or smaller amounts of an alakaline-earth metal hydride, if desired in an inert gas atmosphere, heating the mixture to relatively high temperatures and then forcing the olefine into the mixture under pressure. Generally speaking, temperatures of 200–400° C. and pressures in the region of 100–400 atmospheres have proved suitable for carrying out the process of the invention. The reaction mixture can for example be worked up by steam or vacuum distillation.

The use of the alkaline-earth metal hydrides as catalysts provides special advantages since these compounds are easy to handle and since they have recently become readily available (for example, calcium hydride from calcium carbide and hydrogen).

The following examples further illustrate the invention without limiting it in any way.

*Example 1*

300 parts by weight of aniline and 6 parts by weight of calcium hydride are introduced into an autoclave flushed with nitrogen and heated to 280° C. Ethylene is then forced in to a pressure of 200 atm. gauge. The reaction starts immediately. As soon as the pressure has dropped to 150 atm. gauge, more ethylene is forced in, this being repeated until the absorption ends after about 1 mol of ethylene has been consumed per mol of aniline. 75% of the theoretical yield of N-ethyl aniline, calculated on the aniline used, is obtained when the reaction mixture (about 380 grams) is subjected to fractional distillation. Approximately 5% of the starting material is unchanged.

*Example 2*

300 parts by weight of aniline and 8 parts by weight of magnesium hydride are reacted at 320° C. with ethylene as described in Example 1. After approximately 0.7 mol of olefine has been absorbed per mol of aniline, the reaction ceases. The reaction product is distilled with steam and thereafter fractionated in vacuo. In this way, ⅓ of the aniline introduced is recovered. The yield of N-ethyl aniline is 40% of the theoretical, calculated on the aniline which has reacted.

*Example 3*

300 parts by weight of p-toluidine and 6 parts by weight of calcium hydride are reacted with ethylene at 290° C. in accordance with the process described in Example 1. After 0.9 mol of olefine has been taken up per mol of amine, the reaction ceases. The reaction product is distilled with steam and the amine mixture dried with KOH is thereafter fractionated in vacuo. In addition to unchanged starting material, a yield of 73% of the theoretical of N-ethyl-p-toluidine is obtained as main product. B. P.$_{10}$=93–95° C.

*Example 4*

300 parts by weight of asym. m-xylidine are treated as in Example 1 and in the presence of 6 parts by weight of calcium hydride with ethylene at 290–300° C. On completion of the absorption of ethylene, the amines are blown off with steam and the N-ethyl-m-xylidine is separated from the unmodified initial product by vacuum distillation. B. P.$_{10}$=102–104° C. Yield: 65% of the theoretical.

*Example 5*

300 parts by weight of aniline are reacted with 6 parts by weight of calcium hydride in an autoclave with propylene at a pressure of 250 atm. After the pressure has fallen to 200 atm., more propylene is always introduced under pressure. After the reaction mixture has been subjected to steam distillation, it is fractionated in vacuo. N-isopropyl aniline is obtained as well as unmodified initial material. B. P.$_{10}$=85° C.

We claim:

1. A process for the production of N-alkylated aromatic amines which comprises reacting an aromatic amine with an olefinic hydrocarbon at a temperature of from about 200° to about 400° C. under a pressure of between 100 to 400 atmospheres in the presence, as catalyst of an alkaline-earth metal hydride, said catalyst being present in amounts of from 1 to 5% calculated on the olefinic hydrocarbon used.

2. Process according to claim 1 in which said catalyst is calcium hydride.

3. Process according to claim 1 in which said catalyst is magnesium hydride.

4. A process for the production of N-alkylated aniline which comprises reacting aniline with ethylene at a temperature of 200° to 400° C. and pressures of about 100 to 400 atmospheres in the presence, as catalyst of an alkaline-earth metal hydride, said catalyst being present in amounts of from 1 to 5 parts by weight calculated on the aniline used.

5. Process according to claim 4 in which said catalyst is calcium hydride.

References Cited in the file of this patent

UNITED STATES PATENTS

| | | |
|---|---|---|
| 2,115,884 | Schollkopf | May 3, 1938 |
| 2,449,644 | Danforth | Sept. 21, 1948 |
| 2,501,509 | Gresham et al. | Mar. 21, 1950 |
| 2,501,556 | Whitman | Mar. 21, 1950 |

OTHER REFERENCES

Howk et al.: J. A. C. S., 76; 1899–1902 (1954).